Jan. 13, 1942.    G. A. BORG ET AL    2,269,433
COMPRESSION COUPLING
Original Filed Aug. 28, 1937
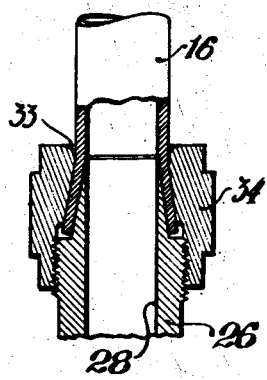
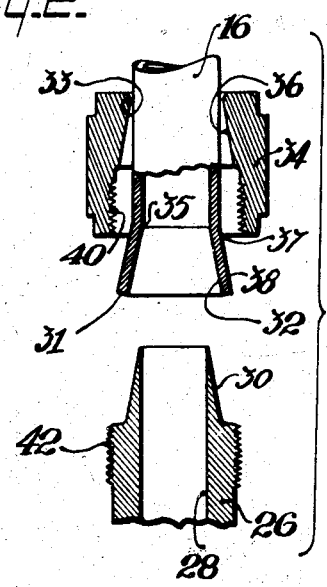
INVENTOR
Gustave A. Borg and
Carl D. Hyland
BY
Brown & Jones
ATTORNEYS Patented Jan. 13, 1942

2,269,433

UNITED STATES PATENT OFFICE 2,269,433

COMPRESSION COUPLING

Gustave A. Borg and Carl G. Hyland, New York, N. Y., assignors, by mesne assignments, to General Fire Extinguisher Company, Providence, R. I., a corporation of Delaware Continuation of application Serial No. 161,388, August 28, 1937. This application September 7, 1938, Serial No. 228,754

1 Claim. (Cl. 285—86)

This invention relates to a compression coupling for coupling malleable pipe at any desired point.

This application is a continuation of our co-pending application Serial No. 161,388, filed August 28, 1937.

In general, it is an object of the invention to provide a compression coupling of the character described, which will efficiently perform the purposes for which it is intended, which is simple and economical of construction, which can be expeditiously, conveniently and safely manipulated, and which can be readily manufactured and assembled.

Another object of the invention is to provide a compression coupling for coupling pieces of pipe together so that the final joint is doubly sealed and so that the pipe and parts of the coupling are in more than line contact, whereby the areas under forced contact tend to remain in contact even when subjected to separating stresses after the contacting force may have been lessened or removed and whereby there is no tendency for the coupling members to shear the pipe off along the area in contact, and to assist in this by providing that the inner and outer surfaces of the spread pipe and the corresponding contacting surfaces of the coupling members are as near parallel as possible after the pipe has been tightened between the coupling members; and to provide a coupling made in this manner which is self-aligning and doubly sealed.

Other objects of the invention will in part be obvious and will in part appear hereinafter.

In the accompanying drawing:

Fig. 1 is a view, partly in section, of a coupling made in accordance with the invention; and Fig. 2 is an exploded view of the parts of the coupling shown in Fig. 1.

Attempts have been made for many years to form a single conduit from two separate conduits without threading one upon the other and by spreading the end of one and using clamping means to hold it to the end of the other. The previous methods and pipes made thereby have not been satisfactory for many reasons. One reason has been that there has been little axial rigidity at the juncture of the surfaces clamped together. Another has been that, due to their formation, a shear developed normally so that the pipes in a large percentage of the cases sheared, especially when the pipes are subjected to vibrations. The present invention avoids these difficulties and gives a joint which tends to remain tight even when the means which first forces the pipe and coupling members together may happen to be separated.

In the drawing, a pipe 16, which is of somewhat malleable metallic material such as soft steel, copper, aluminum or other similar tenacious metal which has sufficient give to be capable of being spread when in the form of a pipe, but not a metal like lead which has great malleability and slight tenacity, is formed by any suitable spreading device to provide a flared end 31 having inner and outer conic surfaces 32 and 38 respectively which are nearly parallel with each other. Into this flared end of the pipe a coupling element 26 is inserted which may be formed from the end of another pipe or may be made as a separate member so as to be threaded onto another pipe. This element or male member 26 has a conduit 28 passing therethrough, or when made as a separate element has an axial bore corresponding to the normal internal dimension of the pipe 16, and its outer surface 30 is geometrically similar to the inner spread surface 32 of pipe 16. These surfaces have the same long taper and are self-aligning when one is positioned on the other. In assembling the coupling, surface 32 is placed in contact with surface 30. There are therefore two surfaces in contact throughout a relatively wide area or band. Means are provided for bringing pipe 16 axially into contact, as above described, with the male member or pipe 26. These means may comprise a nut 34 which has an internal conic surface 36 geometrically similar to and adapted to fit against the outer surface 38 of the expanded part of pipe 16. Nut 34 and male member 26 may be of cast iron or hard steel. Means are also provided for drawing the nut 34 along a path toward the male member 26. These may comprise an internal threaded portion 40 on the inside of nut 34 and a cooperating external threaded portion 42 on the outside of pipe 26 and separated from the end of that pipe by surface 30. The smaller end 33 of surface 36 is carefully rounded off to provide a gradually flared curved surface extending outwardly in the axial direction beyond the outer conic surface 38 of the pipe 16. As nut 34 is screwed onto male member 26, surface 36 comes into contact with surfaces 38 and carries pipe 16 along until the inner surface 32 of the latter is positioned against surface 30 of the former. There are then two pairs of surfaces, each surface in its respective pair being in contact over a large area with the other surface of that pair. As the nut is tightened, the opposed conic surfaces are caused to bear more and more firmly against each other, fitting more exactly and perfectly. During this tightening of the nut the flared end 31 of the pipe is swedged, its larger end being forced along the surface 30 of the male member by as much as one-sixteenth of an inch in the case of a five-eighths inch pipe. It will be seen that the permanently flared end of the outer tube 16 must have been stressed, in the flaring thereof, beyond the elastic limit of the somewhat malleable material of which it is composed. The non-flared tube 26 has not such preparation. During the tightening of the nut 34 it exerts an inward pressure on tube 16 and also on the inner tube 26 which, perhaps giving slightly radially inward, is forced into a swedging, adhesive-like contact with outer tube 16. When the pressure from the nut is removed by the unscrewing of the same, the material of the tube 26 appears to tend to push back outwardly again, since its elastic limit has not been exceeded nor even approached, and the adhesive-like swedging contact continues to hold the two tubes together even when containing fluid under pressure as described below. This application of compressive force is termed "swedging," and under the conditions described gives rise to strong adhesive force between the conical pipe surfaces which continues to exist even when the compressive force is no longer present.

It is extremely important that the conic surface areas be in contact. In order to insure this, care must be taken, during the spreading of pipe 16, to prevent as far as possible surface 32 from being at an angle with surface 38. If the portion of the pipe which is spread is very short and the angle which any spread part makes with its adjacent tubular part (the angle of spread) is relatively large, it will be seen that the edge of the end of the pipe 16 must become quite thin, if not actually sharp, compared to the thickness of the non-spread wall of the pipe 16, as at 35. In that event, inner and outer surfaces 32 and 38 converge rapidly toward each other. That condition is to be avoided because it gives only a circular line of contact between pipe 16 and nut 34 when they meet. That undesirable line contact arises as follows: Surfaces 30 and 36 are made substantially parallel; as nut 34 is turned on male member 26, the surfaces 30 and 36 approach each other; if the wall of the spread part of pipe 16 is wedge-shaped in cross-section, as beforementioned, surfaces 30 and 36 cannot approach any closer to each other than the broad base of the wedge, which base would be of course at about the point 37; therefore, nut 34 digs all around the periphery of pipe 16 into pipe 16 along a linear contact only, i. e., in a circle perpendicular to the axis of the pipe; and the final result is a weak type juncture, further weakened by the biting into the pipe 16 and ready at any time to shear away completely.

To obtain surface contact rather than linear contect between 16 and 34, the angle of spread must not be large, but the spread portion must extend axially for a distance sufficient to give a contact surface. Of course, the flared end of pipe 16, when being stretched, must become some thinner but, if the angle of spread is not large, the extreme end of the flare will only be slightly thinner than the base of the flare. The angle between surfaces 32 and 38 may be no more than might be present by chance in the commercial production of surfaces 30 and 36. Surfaces 36 and 38 meet over large areas and, if there are any small portions not in contact, the spread part of pipe 16 is forced into conformity with the space between the surfaces 36 and 38 when the nut 34 is tightened onto the male member 26. There is, however, no shearing possible as there is no original line contact.

An aluminum pipe has been found satisfactory which has an unspread, outer diameter of 0.601 inch and which is spread for a distance along the axis of 0.5 inch so that the rim has an outer diameter of 0.8 inch. The angle of spread is, therefore, 10° 37'. The unspread thickness of the pipe is 0.05 inch and the thickness of the pipe where it is spread the most, i. e., at the end, is about 0.045 inch. Therefore, the inner and outer spread surfaces make an angle with each other of zero degrees three or four minutes. Such surfaces are to all present intents and purposes parallel.

Although in most cases unnecessary, if desired, surfaces 30 and 36 may originally be made parallel respectively with whatever positions surfaces 32 and 38 have after the end of pipe 16 has been flared.

The element 26 may have a second end similar to the end shown. Such a double element may be inserted between the two spread ends of two pipes and connected to them respectively by two nuts 34.

A coupling made as described above is exceedingly strong. One reason for this strength is the fact that there is no intervening element as in the case of sleeve or collar fittings. The surfaces 30 and 38 are compacted together with such efficiency that often the nut 34 may be removed and a pressure of seventy-five pounds be developed within the pipe before leakage or separation begins to occur between surfaces 30 and 32.

Having described our invention, what we claim as new and desire to secure by Letters Patent is:

In a compression coupling for a somewhat malleable metallic pipe having a flared end with inner and outer conic surfaces nearly parallel with each other; a male member having an axial bore corresponding to the normal internal dimension of said pipe, having at one end an external conic surface of greater extent in the axial direction than is the inner conic surface of the pipe and shaped to make intimate surface contact with the inner conic surface of said pipe, and having beyond the larger end of the said external conic surface an external threaded portion; and a nut having at one end an internal threaded portion for engaging the external threaded portion of said male member and having at its other end an internal conic surface corresponding to the outer conic surface of the pipe and terminating at its smaller end in a gradually flared curved surface extending outwardly in the axial direction beyond the outer conic surface of the pipe; said coupling when tight having a portion of the conic surface of the male member disposed beyond the large end of the flared end of the pipe, with a portion of the flared end of the pipe extending beyond the large end of the conic surface of the nut, and with the flared curved surface of the nut substantially at the junction of the flared end of the pipe and the normal wall of the pipe and extending beyond the inner end of the male member to permit vibrational play of the pipe outside of its contact with the conic surfaces of the nut and male member.

GUSTAVE A. BORG.
CARL G. HYLAND.